No. 779,696. PATENTED JAN. 10, 1905.
F. EPHRAIM.
PROCESS OF AND APPARATUS FOR THE SEPARATION AND RECOVERY
OF GUM FROM RUBBER PLANTS.
APPLICATION FILED SEPT. 21, 1904.
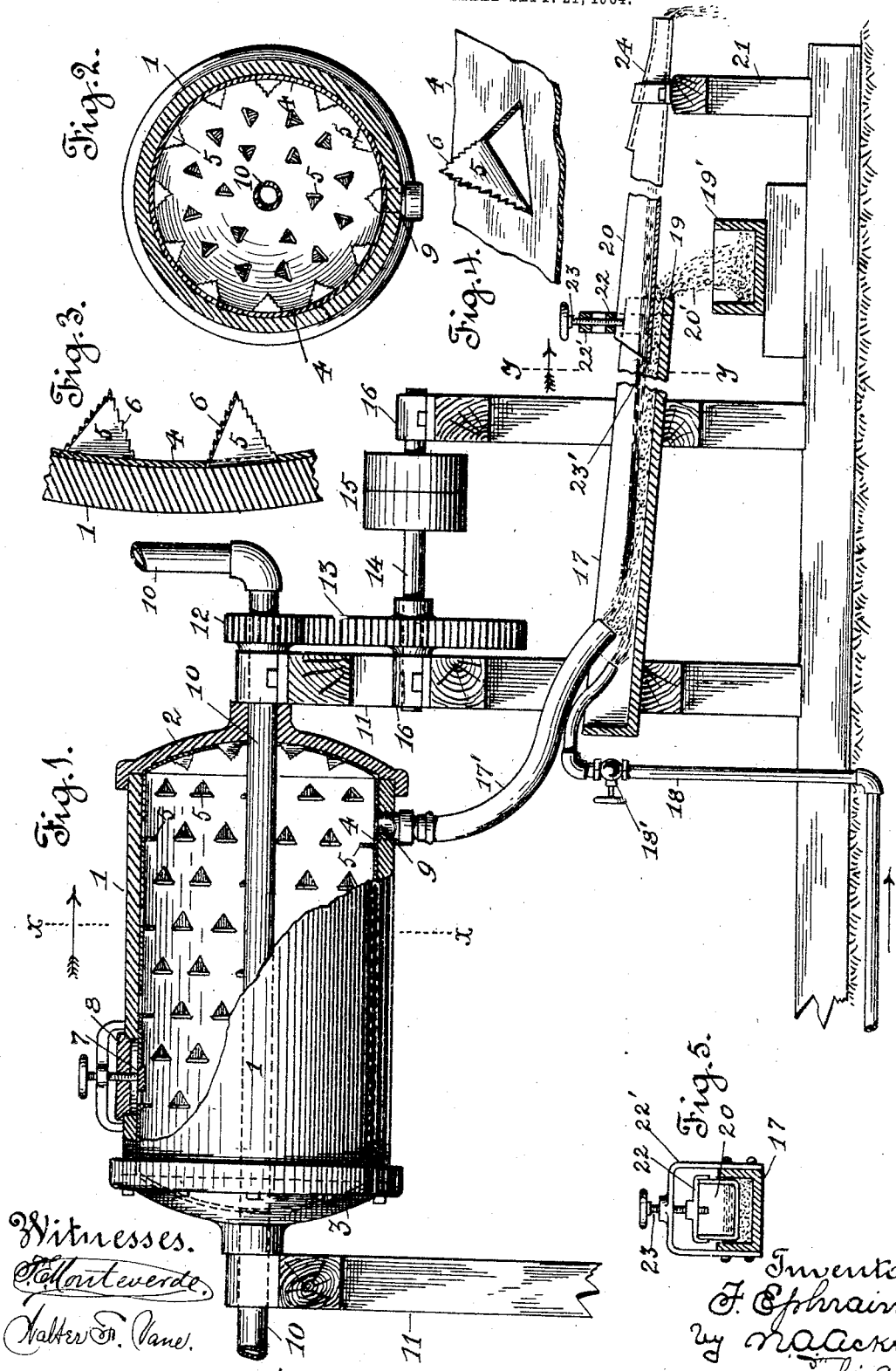

No. 779,696.  
Patented January 10, 1905.

UNITED STATES PATENT OFFICE.

FERDINAND EPHRAIM, OF SAN FRANCISCO, CALIFORNIA, ASSIGNOR OF ONE-HALF TO ALBERT RAAS, OF SAN FRANCISCO, CALIFORNIA.

PROCESS OF AND APPARATUS FOR THE SEPARATION AND RECOVERY OF GUM FROM RUBBER-PLANTS.

SPECIFICATION forming part of Letters Patent No. 779,696, dated January 10, 1905.

Application filed September 21, 1904. Serial No. 225,375.

*To all whom it may concern:*

Be it known that I, FERDINAND EPHRAIM, a citizen of the United States, residing in the city and county of San Francisco, State of California, have invented certain new and useful Improvements in Processes and Apparatus for the Separation and Recovery of Gum from Rubber-Plants; and I do hereby declare the following to be a full, clear, and exact description of the same.

The present invention relates to the treatment of that species of the *Euphorbiaceæ* or other apetalous plants containing caoutchouc for the recovery of rubber therefrom, the process consisting, essentially, in the reduction by mastication of the plant into a finely-divided condition within a closed rotating cylinder, drum, or barrel provided with a series of internal teeth which tear and separate the material placed therein, then withdrawing the finely-reduced material from within the vessel and washing the same with water to wash out the rubber or gummy substance from the reduced mass, and, finally, recovering the floating rubber or separated gum from the washed body of material.

In carrying out the invention an apparatus is employed, which apparatus will be understood by reference to the accompanying sheet of drawings, wherein—

Figure 1 is a side view disclosing the assembled parts, the reducing drum or barrel being partly broken away and the sluice or runway into which the reduced material is discharged being partly sectioned longitudinally. Fig. 2 is a vertical sectional end view in elevation, taken on line $x$ $x$, Fig. 1, of the drawings. Fig. 3 is an enlarged detail sectional view of a portion of the drum or barrel, said view illustrating the arrangement of the inner lining for the barrel or drum and the cutting-teeth for reducing the material treated therein. Fig. 4 is a detail perspective view of a portion of the inner lining; and Fig. 5 is a cross-sectional end view in elevation of the sluiceway, taken on line $y$ $y$, Fig. 1, and viewed in the direction of the arrow, said view illustrating the means for connecting the auxiliary or separating sluiceway to the receiving-sluiceway.

The apparatus for carrying out the process consists of a rotatable drum or barrel 1, having the closed ends 2 3. This drum or barrel is provided with an inner metallic lining 4, which preferably is formed with a series of upset or struck-up V-shaped teeth or projections 5. The edges of these teeth or projections 5 are serrated in order to provide saw-teeth edges 6 for the tearing and reducing of the material with which the barrel or drum 1 is charged. These serrated or saw teeth are aranged close together and extend completely around the inside of the cylinder, drum, or barrel and project inwardly from the ends thereof.

The cylinder, drum, or barrel 1 is provided with a feed-opening 7 for the insertion of the material to be treated, which feed-opening is closed by the removable plug or cover 8. Said cylinder, drum, or barrel is also provided with a threaded outlet 9, which is closed during the working of the cylinder, drum, or barrel by means of a cap (not shown) which screws thereon.

The drum, cylinder, or barrel is mounted for rotation on a pipe 10, which is held within the frame-pieces 11. One of the trunnions of the drum, cylinder, or barrel has secured thereto the cog-pinion 12, which meshes with the cog-gear 13. This gear is mounted on the drive-shaft 14, which is driven from any suitable machinery, preferably by means of a power-belt (not shown) working over the belt-pulleys 15. The drive-shaft 14 works in bearings 16, and the speed transmitted to the cylinder, drum, or barrel 1 is such as to impart thereto approximately four hundred or more revolutions per minute. Through the pipe 10 is conveyed steam or hot air, the purpose thereof being to raise the temperature within the cylinder, drum, or barrel to such a degree as will cause the exudation of milk-juice or gum from the material being treated therein, thereby expediting the separation.

Below the cylinder, drum, or barrel and, if desired, a distance therefrom is located an open sluiceway 17, which receives the reduced material from the cylinder, drum, or barrel 1 through the medium of the hose 17'. This hose is connected or coupled at one end to the threaded outlet 9 when the cylinder, drum, or barrel is brought to a state of rest, its opposite end lying within the sluiceway 17. It will be understood that in lieu of the hose 17' the upper end of the sluiceway may rest immediately below the outlet 9 and the treated material be discharged directly into the same the moment the outlet 9 is opened. Into the sluiceway 17 also extends the water-pipe 18, the flow of water being controlled by the cock 18'. The object of permitting water to flow into the sluiceway and intermix with the material discharged therein is to thoroughly wash such pulverized, ground, or reduced material and separate therefrom the milk-juice or rubber-gum substance to be recovered, which substance will float on the surface of the water delivered into and flowing through the sluiceway 17, the flow of which water will force the material toward the discharge end 19 of the sluiceway, from which it falls into a suitable receptacle or discharge chute or runway 19'. During the flow of the material through the sluiceway 17 the heavier, base, or worthless portions thereof will sink by gravity, while the valuable or lighter portions—that is, the gum to be recovered—will float, as stated, on the surface of the flowing body of water, and such particles must be recovered or skimmed from the surface of the water, else the same will be discharged from the sluiceway with the mass of worthless material.

For the purpose of skimming the separated gum floating on the surface of the body of water flowing through the sluiceway 17 there is arranged within the lower portion thereof an adjustable auxiliary sluiceway 20, which extends a distance beyond the end 19 of the sluiceway 17, from which the base or worthless material 20' is discharged into the receptacle or chute 19'. This auxiliary sluiceway 20 is held at its outer end by means of the support 21, while at its inner end it is adjustably held within the sluiceway 17 by the adjusting or regulating hangers 22 22', which are connected by the controlling-screw 23. The position of this auxiliary sluiceway 20 is such that its forward edge 23' is just below the level of the body of water flowing through the sluice 17. Hence the floating gum (or gum particles carried by the flow of water) is skimmed from the surface of the water and enters the auxiliary sluice 20, from which it flows into any suitable receptacle placed below the discharge end of the said sluice. The lower end of the auxiliary sluice is formed into a funnel-section 24, onto which the end of a hose may be placed for leading the separated or recovered material into vats or tanks located a distance therefrom. It will be understood that the auxiliary sluice is adjusted in accordance with the body of water flowing through the sluice 17, the intent being to maintain the said auxiliary sluice at such a position as to place its receiving edge just beneath the surface of the said body of water.

In the carrying out of the process the cylinder, drum, or barrel is first filled with the plant from which the gum is to be extracted. The said cylinder, drum, or barrel is then rotated at a high speed, which causes the material to be thrown again and again with great force against the saw-teeth, causing the same to be thoroughly reduced or masticated into exceeding fine particles. During this tumbling and cutting of the material the interior of the cylinder, drum, or barrel is raised to a high temperature by the steam or hot air flowing through the pipe 7, the heat within the cylinder, drum, or barrel thus produced causing the milk-juice or gum to exude from the material being gradually reduced to a pulp. After the material has been fully reduced the outlet of the cylinder, drum, or barrel is opened, rotation of the cylinder having ceased, and the pulp permitted to escape into the sluice 17, water being admitted thereto to thoroughly wash the same and separate the gum therefrom, which gum floating on the surface of the water is removed therefrom by being skimmed off by means of the auxiliary sluice.

Having thus described the invention, what is claimed as new, and desired to be protected by Letters Patent, is—

1. The process of reducing rubber-plants and separating the gum therefrom which consists of tearing the same into small particles within a closed rotating cylinder, applying heat to the interior of the cylinder for the purpose of causing the gum to exude from the torn and mangled material, removing the pulp thus formed and delivering the same into a washing-sluice, forcing water into the sluice to wash the material delivered therein and cause the gum to separate therefrom, and thence skimming the gum floating on the surface of the water flowing through the said sluice.

2. An apparatus for the reduction of rubber-plants and separation of the gum therefrom, the same comprising a rotatable cylinder, a series of cutting-teeth secured to the interior walls thereof, mechanism for imparting a high rotative speed to the cylinder, means for supplying heat to the interior of the said cylinder, a sluice arranged below the cylinder and into which the pulp is discharged, a water-supply for conveying water to the sluice for washing the pulp delivered thereto, and means for removing the washed-out gum floating on the surface of the water flowing through the sluice.

3. An apparatus for reducing gum-plants and separating the gum or milk-juice therefrom, the same comprising an internally-heated revolving cylinder, a series of cutting-teeth arranged within the cylinder, means for imparting rotation to the cylinder, a runway or sluice arranged beneath the cylinder for receiving the pulp therefrom, a water-supply leading to said runway or sluice for injecting water onto the pulp to wash and separate the gum therefrom, and an auxiliary sluice adjustably connected to the receiving runway or sluice, said auxiliary sluice skimming the floating gum from the surface of the water flowing through the receiving runway or sluice.

4. The process of reducing rubber-plant to a pulp and separating the gum therefrom which consists in tearing and cutting the material within a closed rapidly-rotating vessel, subjecting the material being thus treated to a heat sufficient to cause the gum or milk-juice to exude therefrom, then washing the pulp so formed to separate the gum and finally removing the floating portions of separated gum from the surface of the water within which the material was washed.

In witness whereof I have hereunto set my hand.

FERDINAND EPHRAIM.

Witnesses:
N. A. ACKER,
WALTER F. VANE.